US012494117B2

(12) United States Patent
Miller et al.

(10) Patent No.: US 12,494,117 B2
(45) Date of Patent: Dec. 9, 2025

(54) ELECTRICAL SWITCH USABLE WITH WIRE WRAP EAS TAG

(71) Applicant: Sensormatic Electronics, LLC, Boca Raton, FL (US)

(72) Inventors: Channing E Miller, Fort Lauderdale, FL (US); Edward P. Ellers, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 284 days.

(21) Appl. No.: 18/177,635

(22) Filed: Mar. 2, 2023

(65) Prior Publication Data

US 2023/0206738 A1 Jun. 29, 2023

Related U.S. Application Data

(63) Continuation of application No. 17/508,135, filed on Oct. 22, 2021, now Pat. No. 11,610,462.
(Continued)

(51) Int. Cl.
*G08B 13/24* (2006.01)
*E05B 9/00* (2006.01)
(Continued)

(52) U.S. Cl.
CPC ...... *G08B 13/2434* (2013.01); *E05B 15/0046* (2013.01); *E05B 73/0029* (2013.01);
(Continued)

(58) Field of Classification Search
CPC ............ G08B 13/2434; G08B 13/1445; G08B 13/1454; G08B 13/1463; G08B 13/2405;
(Continued)

(56) References Cited

U.S. PATENT DOCUMENTS 4,006,322 A * 2/1977 Gallatin ............... H01H 1/2083 200/275
4,104,494 A * 8/1978 Swann .................. H01H 1/365 200/243
(Continued)

FOREIGN PATENT DOCUMENTS

CN 103271494 A 9/2013
CN 107452173 A 12/2017
(Continued)

OTHER PUBLICATIONS

Annex to Form PCT/ISA/206 in PCT/US2021/072001, mailed on Feb. 9, 2022, 9 pages.

*Primary Examiner* — William A Bolton
(74) *Attorney, Agent, or Firm* — ArentFox Schiff LLP

(57) ABSTRACT

An electrical switch with a conductive bridge, a first wire configured to provide continuity with the conductive bridge, and a biasing member connected to the first wire. The biasing member provides a threshold reaction force to maintain continuity between the first wire and the conductive bridge. The switch further includes a housing that directs tensile forces acting upon the first wire to oppose a reaction force of the biasing member. When a tensile force acting on the first wire exceeds a threshold reaction force of the biasing member continuity between the first wire and the conductive bridge is broken.

20 Claims, 10 Drawing Sheets

Related U.S. Application Data

(60) Provisional application No. 63/105,014, filed on Oct. 23, 2020.

(51) Int. Cl.

| | |
|---|---|
| ***E05B 15/00*** | (2006.01) |
| ***E05B 47/00*** | (2006.01) |
| ***E05B 73/00*** | (2006.01) |
| ***G08B 7/06*** | (2006.01) |
| ***G08B 13/14*** | (2006.01) |

(52) U.S. Cl.

CPC ........... *G08B 7/06* (2013.01); *G08B 13/1445* (2013.01); *G08B 13/1454* (2013.01); *G08B 13/1463* (2013.01); *G08B 13/2405* (2013.01); *G08B 13/2431* (2013.01); *E05B 2009/006* (2013.01); *E05B 2047/005* (2013.01); *E05B 2047/0067* (2013.01)

(58) Field of Classification Search

CPC ........... G08B 13/2431; G08B 13/2448; E05B 15/0046; E05B 73/0029; E05B 2009/006; E05B 2047/005; E05B 2047/0067

USPC ............. 200/243; 70/57.1; 340/568.2, 568.1, 340/572.1

See application file for complete search history.

(56) References Cited

U.S. PATENT DOCUMENTS

| | | | | |
|---|---|---|---|---|
| 6,198,391 | B1 | 3/2001 | Devolpi | |
| 6,737,598 | B1 * | 5/2004 | Allen | H01H 15/102 200/538 |
| 6,880,226 | B2 * | 4/2005 | McGill | H01H 50/546 29/877 |
| 7,984,629 | B2 | 7/2011 | Xiaobin | |
| 8,087,269 | B2 | 1/2012 | Conti et al. | |
| 8,122,744 | B2 | 2/2012 | Conti et al. | |
| 8,917,180 | B2 | 12/2014 | Sayegh et al. | |
| 9,262,900 | B2 | 2/2016 | Luo et al. | |
| 2013/0199909 | A1 * | 8/2013 | Young | H01H 13/14 200/345 |
| 2014/0253280 | A1 * | 9/2014 | Kim | H01H 37/323 337/139 |
| 2015/0287299 | A1 | 10/2015 | Eckert et al. | |
| 2022/0180144 | A1 | 6/2022 | Sandoval et al. | |

FOREIGN PATENT DOCUMENTS

| | | | |
|---|---|---|---|
| CN | 209637448 | U | 11/2019 |
| DE | 4434420 | A1 | 3/1995 |
| JP | 2019040576 | A | 3/2019 |
| WO | 2020112972 | A1 | 6/2020 |

* cited by examiner

ELECTRICAL SWITCH USABLE WITH WIRE WRAP EAS TAG

CROSS REFERENCE TO RELATED APPLICATIONS

The present application claims priority to U.S. Non-Provisional application Ser. No. 17/508,135 entitled "BOOT WIRE WRAP EAS TAG," filed Oct. 22, 2021, which claims priority to U.S. Provisional Application No. 63/105,014 entitled "BOOT WIRE WRAP EAS TAG," filed Oct. 23, 2020. Both aforementioned applications are hereby incorporated by reference in the entirety.

BACKGROUND

The present disclosure relates generally to Electronic Article Surveillance (EAS). The present disclosure relates more particularly to EAS tags incorporating wire wraps for use with boots and similar articles of footwear.

In an EAS system, tags are placed on inventory items, and an alarm is triggered if a reader detects a tag leaving a designated area. In many EAS systems, the reader comprises of two parts—a transmitter and a receiver—that detect any active tag that passes between them. EAS technologies include electro-magnetic (EM) systems, acousto-magnetic (AM) systems, and radio-frequency (RF) systems. In some systems, the tags remain attached to products after their sale, but the tags are deactivated to prevent detection at the reader. However, tags that remain attached to products are designed to be inexpensive to manufacture, and are easy to tamper with.

Expensive items are often protected with more robust tags, which may comprise of a hard plastic enclosure, a method of attachment that can only be removed with specialized equipment, and a counter-measure to tampering, such as the release of a liquid dye. However, some methods of attachment may damage the item that is being sold. For example, a common method of attachment requires piercing the item with a metal pin that is then secured in the main body of the tag. This method of attachment may leave a permanent mark on items, which makes the item less desirable to a customer.

In the sale of footwear, some methods of attaching tags may interfere with a customer's ability to try on the footwear. For example, a pair of boots may be secured together through use of a cut-resistant cable, making it difficult to walk while wearing the boots; or a portion of the tag may need to be placed inside of a boot, making the boot uncomfortable to wear. Since footwear are generally sold as a pair, a potential thief may be dissuaded if only one of each pair is put on display. However, when a customer wants to try on a pair, a sales assistant must go to retrieve the matching article of footwear, which is an inefficient use of time and may leave a store unattended.

Wire-wrap tags provide a potential solution to the specific EAS requirements of footwear. However, existing designs for wire-wrap tags feature two hard plastic components connected by four wires. These designs are ideally suited for attachment to cuboid objects, such as retail items supplied in boxes, but, when attached to articles of footwear, either do not attach securely or have one or more slack connecting wires after attachment.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to an EAS device configured to be securely attachable to a boot or similar article of footwear, without damage to the footwear, and having a tension switch that can trigger an alarm when a threshold amount of tension is applied to one or more wires of the EAS device. Further, for example, the threshold amount of tension may be configured to enable a customer to wear the article of footwear without hindrance and without setting off the alarm.

In an example aspect of the disclosure, an electrical switch that may include a conductive bridge, a first wire configured to provide continuity with the conductive bridge, and a biasing member connected to the first wire. The biasing member provides a threshold reaction force to maintain continuity between the first wire and the conductive bridge. The switch further includes a housing that directs tensile forces acting upon the first wire to oppose a reaction force of the biasing member. When a tensile force acting on the first wire exceeds a threshold reaction force of the biasing member continuity between the first wire and the conductive bridge is broken.

In an example aspect of the disclosure an electrical switch that opens under tension is disclosed. The electrical switch may include a conductive bridge, a first wire, and a second wire in continuity with the conductive bridge. The electrical switch may further include a first biasing member configured to apply a reaction force to the first wire and a second biasing member configured to apply a reaction force to the second wire, wherein the first biasing member and second biasing member maintain continuity between the first wire and the conductive bridge and the second wire and the conductive bridge. The electrical switch may further include a housing that directs tensile forces acting upon the first wire or the second wire to act in opposition to at least one of the first biasing member and the second biasing member; wherein a tensile force exerted on either one of the first wire or the second wire that exceeds a threshold amount breaks the continuity between the respective one of the first wire or the second wire and the conductive bridge.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1A:
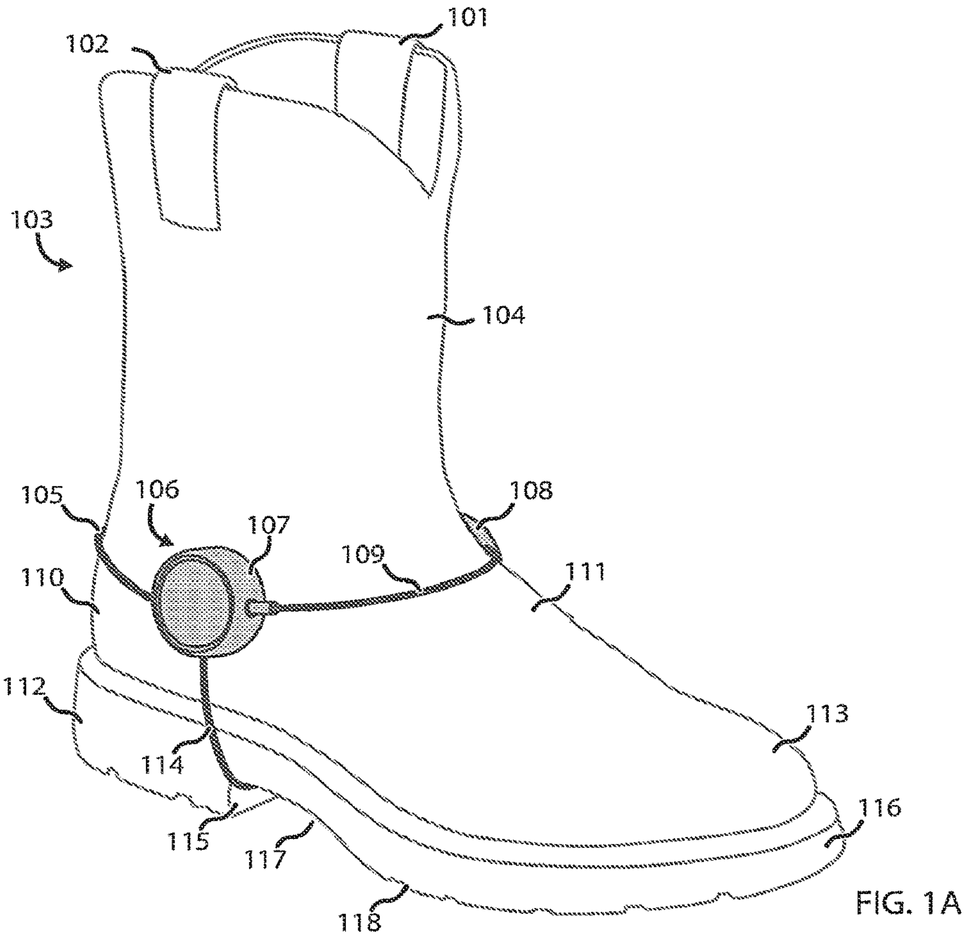
FIG. 1A is a perspective view of a boot with an attached tag, according to some aspects.
Figure 1B:
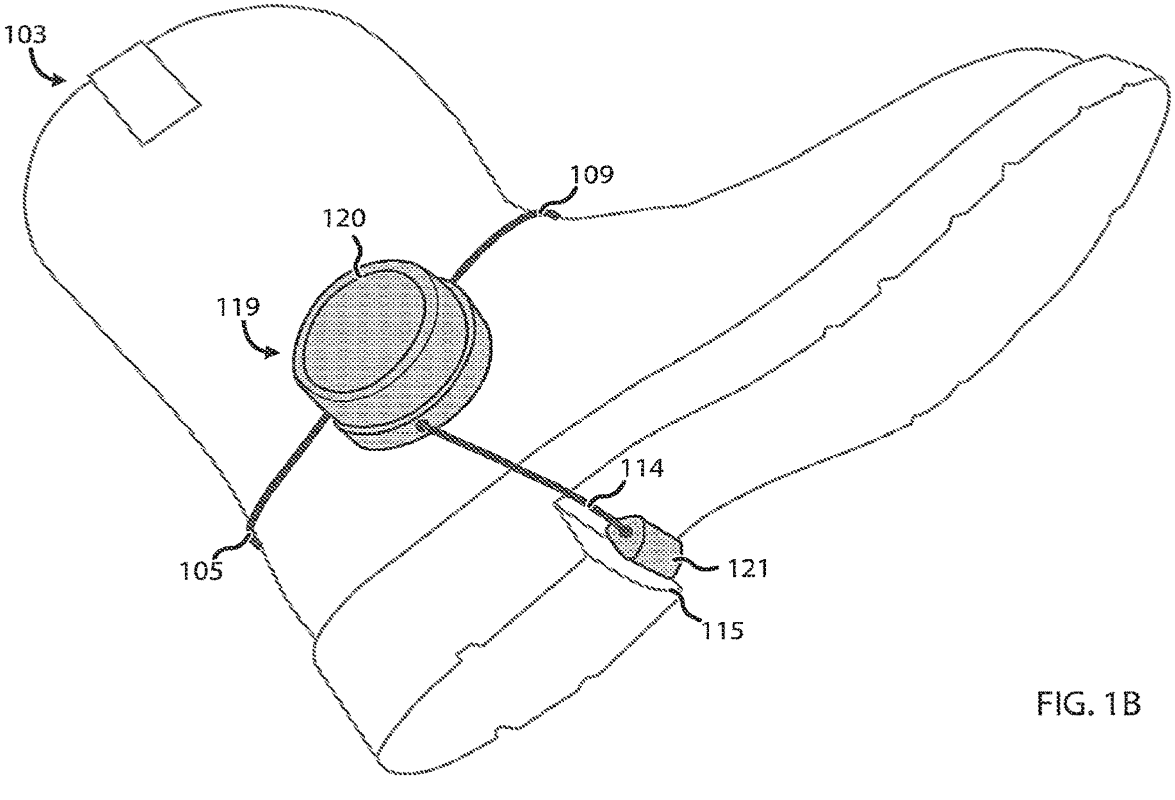
FIG. 1B is a second perspective view of a boot with an attached tag, according to some aspects.

Turning now to FIG. 1A, a perspective view of a boot with an attached tag is shown, according to some aspects. FIG. 1B shows the same boot from a partially underneath perspective. Boot 103 comprises pull straps 101 and 102, boot shaft 104, instep 111, heel 112, heel counter 110, heel breast 115, arch 117, sole 118, toe 113, and outsole 116.

Boot Wire Tag

Boot wire tag 106 comprises tags 107 and 108 connected by wires 105, 109, and 114. Wires 109 and 105 encircle boot shaft 104. Wire 109 loops over instep 111, wire 105 loops over heel counter 110, and wire 114 loops under arch 117.

Tag 120 is an alternative aspect of tag 107. With regards to the arrangement of wires, boot wire tag 119 can be considered as equivalent to boot wire tag 106.

Wires 105, 109, 114 are an appropriate length so as not to damage boot 103, but also to prevent removal of boot wire tag 106. Wire 114 restricts the movement of boot wire tag 106 so as to prevent wires 105 and 109 from passing over the top of boot shaft 104, even if boot shaft 104 is manually deformed by a potential thief. Wire 114 is secured against heel breast 115 to prevent removal over heel 112. The length of wire 105 prevents its removal over heel 112, and the length of wire 109 prevents its removal over toe 113.

In some aspects, boot wire tag 106 may be attached in a multitude of arrangements, so long as tag 107 and tag 108 are placed on opposite sides of boot 103, one of the three wires is looped under arch 117, and the remaining two wires encircle shaft 104.

In some aspects, a single length of wire may be used to connect all components. For example, starting at tag 108, following the path of wire 105, passing through tag 107, following the path of wire 114, passing through tag 108, and following the path of wire 109 back to tag 107. Any number of wires may be used, including multiple, separate wires following the same paths. For example, two separate lengths of wire following the path of wire 114.

The wires used in a boot wire tag assembly may be steel cables; a conductive core surrounded by a plastic or rubber insulator; a plurality of conductive cores, each surrounded by a plastic or rubber insulator; or some other type of wire. In some aspects, the wires comprise a component to make the wire more difficult to cut, such as steel cable or woven steel outer jacket.

Figure 2:
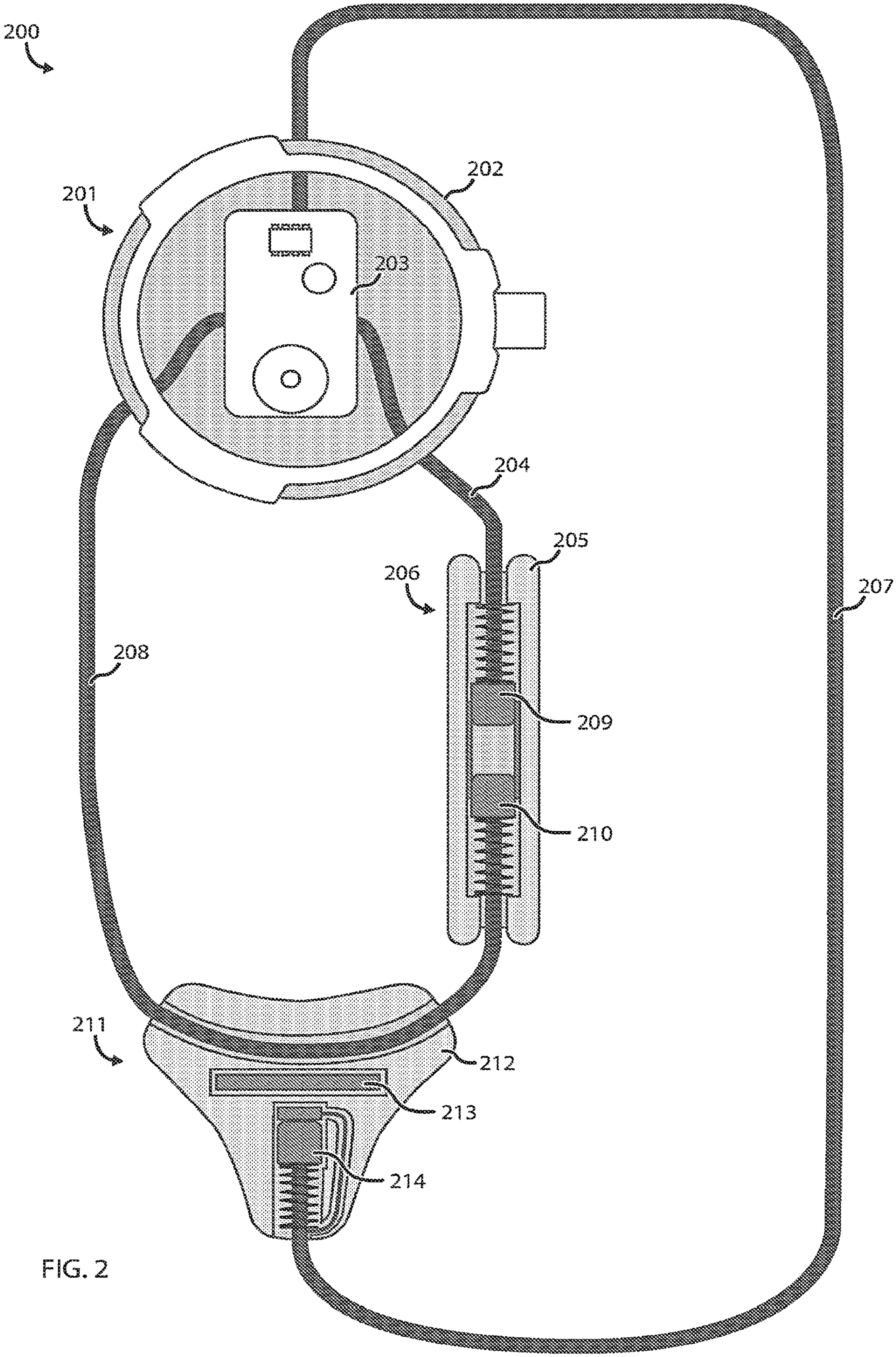
FIG. 2 is a cross-sectional drawing of component parts in a boot wire tag, according to some aspects
Figure 3:
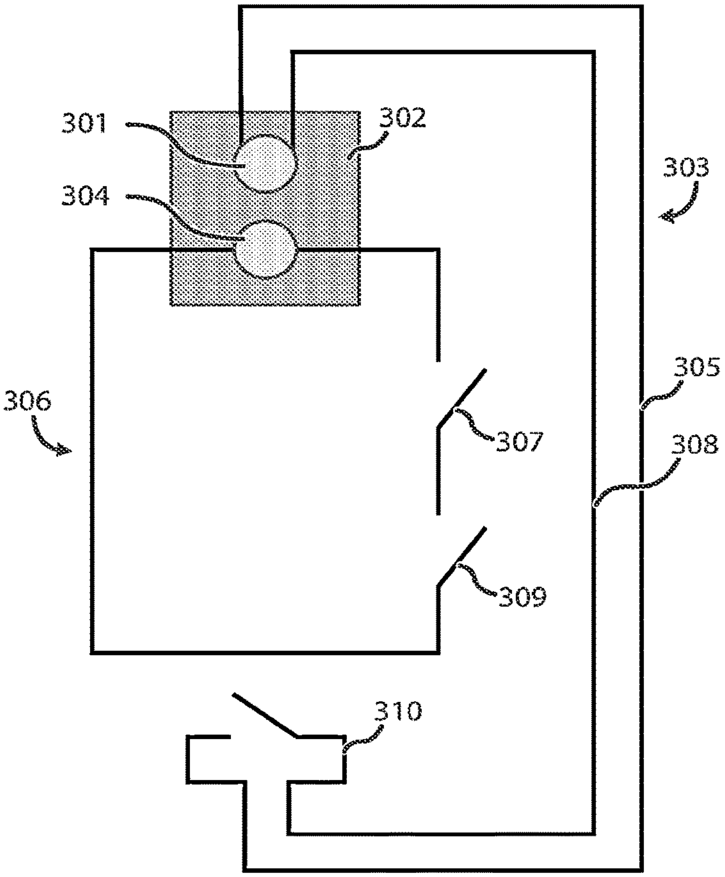
FIG. 3 is a circuit diagram of tension switches in a boot wire tag, according to some aspects.

In some aspects, wire 114 loops through block 121, which may be an inline tension switch, such as described in relation to FIG. 2, FIG. 3, and FIG. 4, or may be a shaped block of plastic, metal, wood, or other material. Block 121 may move freely along wire 114, or block 121 may be secured at a fixed location along the length of wire 114. The purpose of block 121 may be to further secure wire 121 in position adjacent to heel breast 115, and the outer surface of block 121 may be coated in a high-friction material in pursuit of that purpose. Block 121 may have a cross section that is roughly triangular, square, circular, or some other shape.

In some aspects, any or all of wires 105, 109, and 114 may feature a block similar to block 121. The purpose of the block may be as an inline tension switch, to prevent the wire from rolling in a lateral direction, to prevent tension of the wire from damaging boot 103, an alternative purpose, or a combination of these purposes. The block may be shaped to match the contours of the location in which it is to be situated, such as a flat, curved shape to match heel counter 110 or have two edges arranged at 90 degrees to match the intersection of heel breast 115 and arch 117.

Turning now to FIG. 2, a cross-sectional drawing of component parts in a boot wire tag is shown, according to some aspects. Boot wire tag 200 comprises tag 201, inline tension switch 206, tag 211, and connecting wires 204, 207, and 208. The lengths shown for connecting wires 204, 207, and 208 are for illustrative purposes only, and actual aspects may use wires of any length.

An example arrangement of boot wire tag 200 may be with tag 201 in the location of tag 107 of FIG. 1, tag 211 in the location of tag 108 of FIG. 1, and inline tension switch 206 in the position of block 121 of FIG. 1. In this arrangement, wire 204 would be in the position of wire 114, wire 208 would be in the position of wire 105, and wire 207 would be in the position of wire 109.

Tag 201 further comprises enclosure 202, which may be plastic, metal, or other durable, tamper-resistant material; and circuit board 203, which may further comprise alarm speaker, LED, battery, passive electrical components, integrated circuit chips, and/or other components as required. Potential aspects of tag 201 are described in relation to FIG. 9 and FIG. 10.

Inline tension switch 206 further comprises enclosure 205, which may be plastic, metal, or other durable, tamper-resistant material; and electrical contacts 209 and 210. The separation of electrical contacts 209 and 210 under tension may be used to deactivate the switch. Potential aspects of inline tension switch 206 are described in relation to FIG. 4, FIG. 5, and FIG. 6.

Tag 211 further comprises enclosure 212, which may be plastic, metal, or other durable, tamper-resistant material; EAS component 213, which may be an acousto-magnetic (AM) tag, an electronic article surveillance (EAS) tag, an electro-magnetic (EM) tag, a radio frequency (RF) tag, a radio frequency identifier (RFID) tag, or other type of tag; and terminating tension switch 214. Potential aspects of tag 211 are described in relation to FIG. 7 and FIG. 8.

Turning now to FIG. 3, a circuit diagram of tension switches is shown, according to some aspects. A boot wire tag may comprise circuit loops 306 and 303. Circuit loop 306 may further comprise switches 307 and 309, which correspond to electrical contacts 209 and 210 of FIG. 2 respectively. Circuit loop 303 may further comprise switch 310, which corresponds to terminating tension switch 214 of FIG. 2. Conductors 305 and 308 may be incorporated into the same wire, such as wire 207. Wire loop monitors 301 and 304 monitor the status of switches in circuit loops 303 and 306 respectively. Wire loop monitors 301 and 304 may be individual components, such as integrated circuit chips, or arrangements of electronic components. In some aspects, wire loop monitors 301 and 304 are incorporated into component 302; which may be an integrated circuit chip, microcontroller, or similar electrical component.

Switches 307, 309, and 310 may be normally closed switches, which open under the effect of increased tension in a wire. Wire loop monitors 301 and 304 may detect the broken circuit created by open switches, using any known method, and trigger an alarm state. This method also triggers an alarm state if any wires are cut, since that would similarly cause a break in the circuit.

Figure 4A:
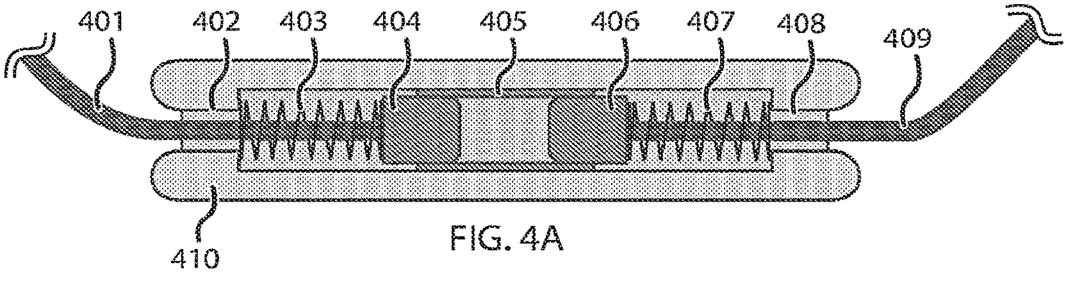
FIG. 4A is a cross-sectional diagram of an inline tension switch in a closed state, according to some aspects.

Turning now to FIG. 4A, a cross-sectional diagram of an inline tension switch in a closed state is shown, according to some aspects. Wire 401 enters enclosure 410 through orifice 402, and makes an electrically conductive connection to bullet 404; and wire 409 enters enclosure 410 through orifice 408, and makes an electrically conductive connection to bullet 406. In the closed position, bullets 404 and 406 are in physical contact with barrel 405. Bullets 404 and 406, and barrel 405 are made from electrically conductive materials, such that in the closed position they form a conductive path between wire 401 and wire 409. Spring 403 is wedged between the inner surface of orifice 402 and bullet 404, and acts to push bullet 404 into contact with barrel 405. Similarly, spring 407 is wedged between the inner surface of orifice 408 and bullet 406, and acts to push bullet 406 into contact with barrel 405.

In some aspects, bullets 404 and 406 are prevented from traveling further into the center of barrel 405 by tension on wires 401 and 409 respectively. In some aspects, a divider is inserted into barrel 405, approximately halfway along its length. The divider may be electrically conductive or non-conductive, and restricts the distance to which bullets 404 and 406 can penetrate into barrel 405.

In some aspects, barrel 405 is replaced with clips, or otherwise shaped metal. A clip may exert a compressive force on the sides of a bullet, such as bullet 404 or bullet 406, to ensure than an electrical contact is maintained.

Figure 4B:
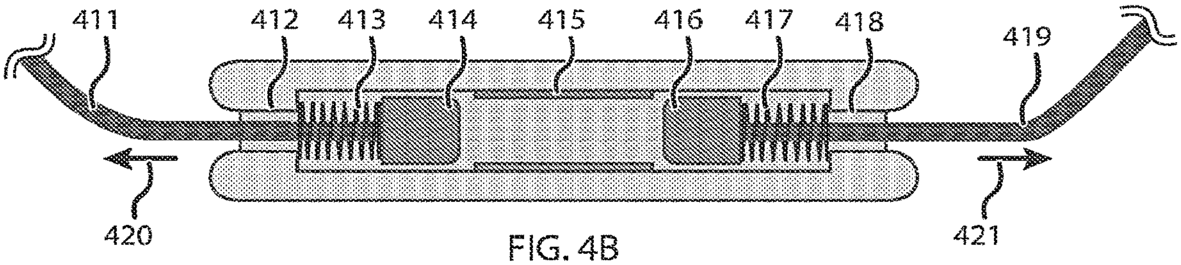
FIG. 4B is a cross-sectional diagram of an inline tension switch in an open state, according to some aspects.

Turning now to FIG. 4B, a cross-sectional diagram of an inline tension switch in an open state is shown, according to some aspects. Tension on wire 411 in direction 420 causes bullet 414 to compress spring 413 against the inner edge of orifice 412. In addition, the motion of bullet 414 breaks electrical contact with barrel 415, creating a break in the circuit. Alternatively, or in addition to, tension on wire 419 in direction 421 causes bullet 416 to compress spring 417 against the inner edge of orifice 418. In addition, the motion of bullet 416 breaks electrical contact with barrel 415, creating a break in the circuit.

When tension is reduced on wire 411, the force exerted by spring 413 pushes bullet 414 back into electrical contact with barrel 415, closing that part of the switch. Similarly, when tension is reduced on wire 419, the force exerted by spring 417 pushes bullet 416 back into electrical contact with barrel 415, closing that part of the switch. When there is sufficiently low tension on both wires 411 and 419, a conductive path is made between wire 411 and 419.

In some aspects, springs 413 and 417 may be replaced with metal, plastic, or other material that is elastically deformed under the effect of tension on wires 411 and 419. After the tension reduces, the elastically deformed material may return to its original shape, and in doing so push a bullet, or similar electrical contact, back into contact with barrel 415. In some aspects, the components are arranged such that bullets, or similar electrical contacts, are pulled into contact with barrel 415, or similar conductive bridge.

An inline tension switch may be designed to have an acceptable distance of travel, before there is a break in the circuit. For example, this may be used to accommodate flexing in a boot or similar footwear article when it is being tried on, and/or to prevent accidental activation of the alarm when the boot or similar footwear article is being handled. The acceptable distance of travel may be configured through selecting a length for barrel 415. For example, a longer length of barrel 415 would accommodate longer travel of bullets 414 and 416 before they lose contact with barrel 415.

Figure 5A:
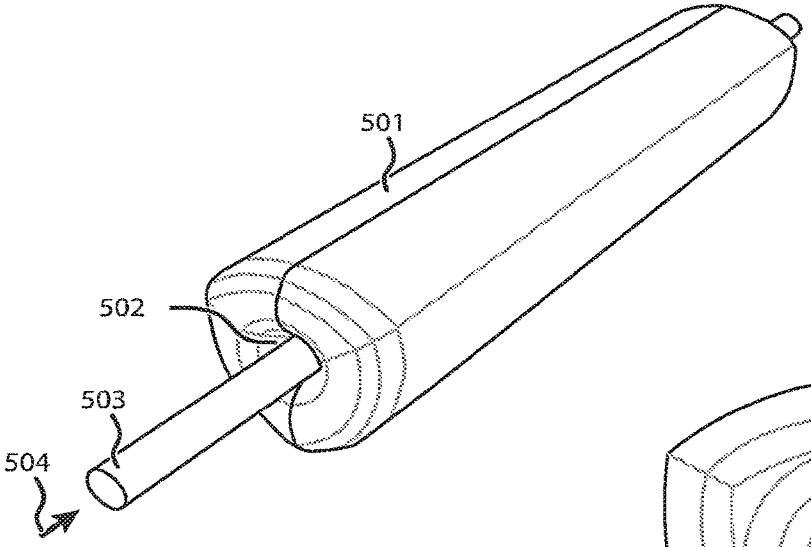
FIG. 5A is a perspective drawing of an inline tension switch, according to some aspects.
Figure 5B:
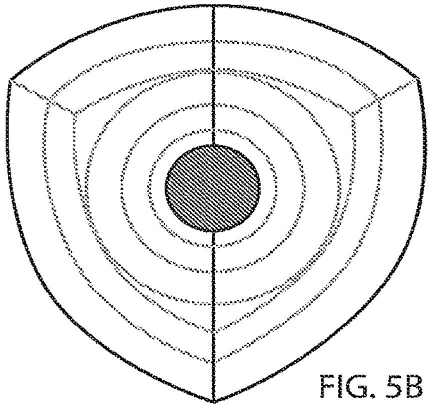
FIG. 5B is an elevation drawing of an inline tension switch, according to some aspects.

Turning now to FIG. 5A, a perspective drawing of an inline tension switch is shown, according to some aspects. The cross section of inline tension switch enclosure 501 may be a Reuleaux triangle, as shown in FIG. 5B, which is an elevation view as seen from direction 504. Inline tension switch enclosure 501 may further comprise curved recesses around orifices where wires enter the enclosure, such as recess 502 surrounding wire 503. The curved recess distributes the force exerted on a wire when it is bent after exiting the orifice.

Figure 6:
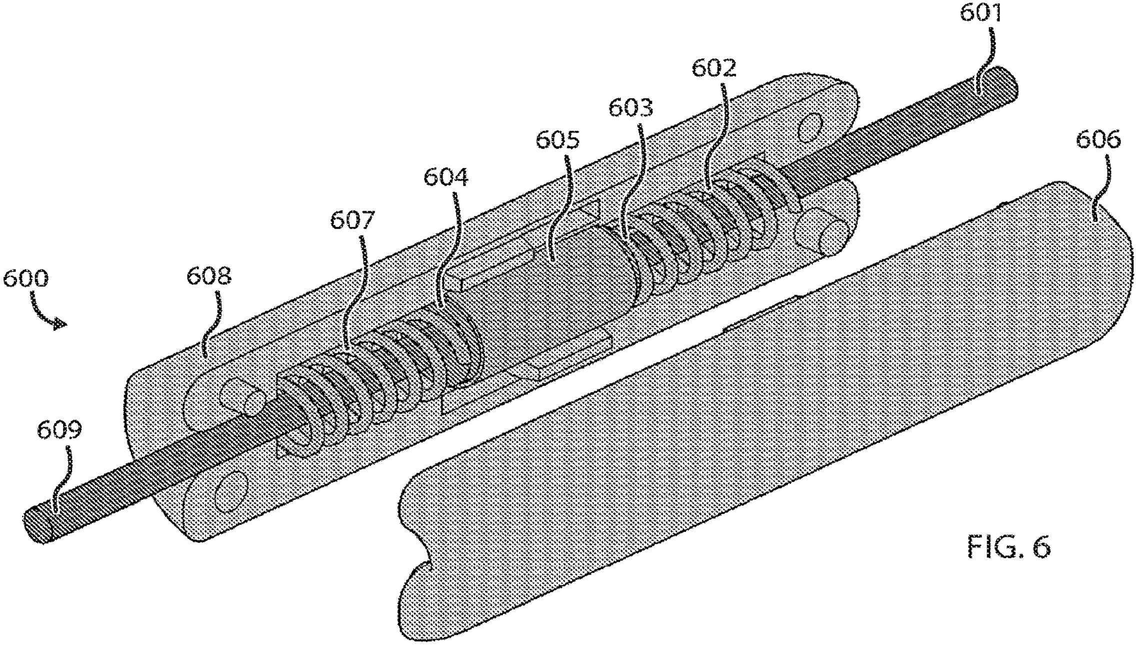
FIG. 6 is a perspective drawing of an inline tension switch, according to some aspects

Turning now to FIG. 6, a perspective drawing of the internal components of an inline tension switch is shown, according to some aspects. The components shown are equivalent to components shown in FIG. 4A and FIG. 4B. Inline tension switch 600 comprises two halves of housing 608 and 606. Wire 609 makes an electrically conductive connection to bullet 604; and wire 601 makes an electrically conductive connection to bullet 403. Spring 607 pushes bullet 604 into barrel 605, where it establishes and electrically conductive connection. Spring 602 pushes bullet 603 into barrel 605, where it establishes and electrically conductive connection. Pulling wire 609 withdraws bullet 604 from barrel 605, breaks the electrical contact, and compresses spring 607. Pulling wire 601 withdraws bullet 603 from barrel 605, breaks the electrical contact, and compresses spring 602.

Figure 7:
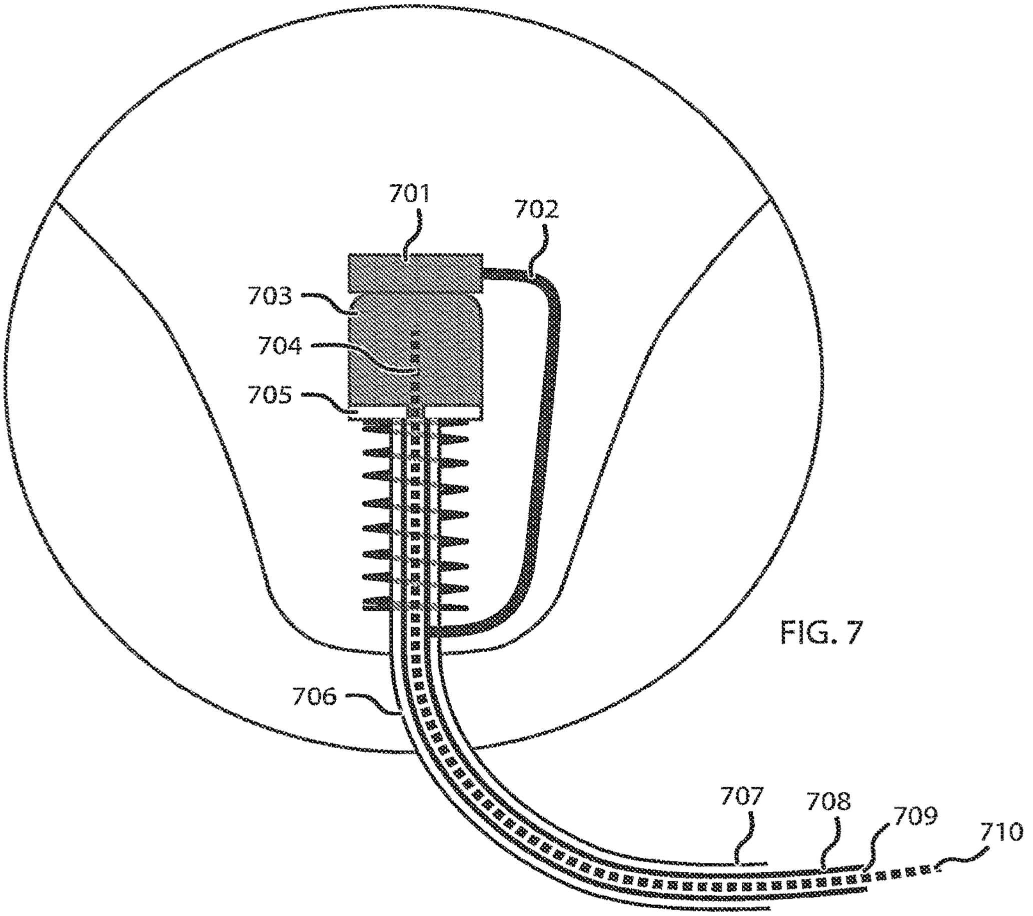
FIG. 7 is a cross-sectional view of a terminating tension switch, according to some aspects.

Turning now to FIG. 7, a detailed view of a terminating tension switch, such as terminating tension switch 214 of FIG. 2, is shown, according to some aspects. Wire 706 comprises inner conductor 710 and outer conductor 708, which are separated by dielectric insulator 709. Wire 706 further comprises an insulating jacket 707. The composition of wire 706 may be similar to coaxial cable. Portion 704 of the inner conductor is connected to bullet 703. All other component elements of wire 706 may terminate at or before insulating base 705, which may feature a crimp or other mechanical component to securely couple bullet 703 to wire 706. Bypass wire 702 connects outer conductor 708 to contact plate 701. Both contact plate 701 and bullet 704 are made from electrically conducting materials. When contact plate 701 and bullet 703 are in physical contact, an electrical current can flow from outer conductor 708, through bypass wire 702, through contact plate 701, through bullet 703, and into inner conductor 710, or in the reverse direction.

In some aspects, wire 706 comprises two parallel conducting wires, a twisted pair of conducting wires, or some other arrangement of conductors.

Figure 8A:
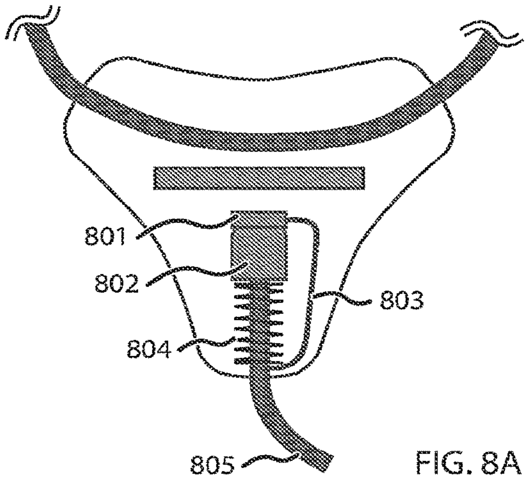
FIG. 8A is a cross-sectional drawing of a terminating tension switch in a closed position, according to some aspects.

Turning now to FIG. 8A, a cross-sectional view of a terminating tension switch in a closed position is shown, according to some aspects. Wire 805 comprises two conductors insulated from each other, with one conductor connected to bullet 802 and the other conductor connected to contact plate 801 via bypass wire 803, as described in relation to FIG. 7. Spring 804 exerts a force on bullet 802 to push bullet 802 into contact with contact plate 801.

Figure 8B:
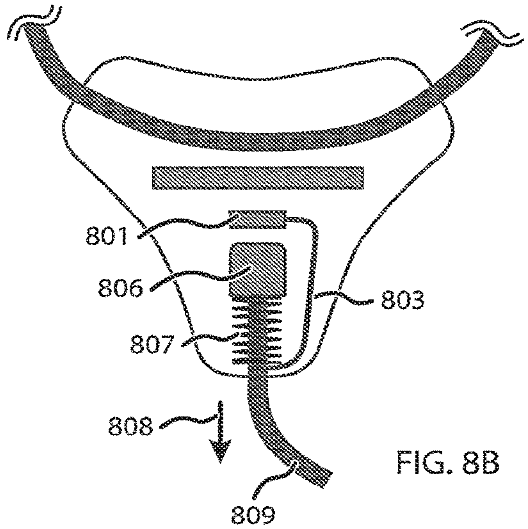
FIG. 8B is a cross-sectional drawing of a terminating tension switch in an open position, according to some aspects.

Turning now to FIG. 8B, a cross-sectional view of a terminating tension switch in an open position is shown, according to some aspects. When a force is exerted on wire 809 in direction 808, bullet 806 is pulled in the same direction and is no longer in contact with contact plate 801. This action breaks the circuit between the two conductors in wire 809. The motion of bullet 806 compresses spring 807. When the force on wire 809 lessens, compressed spring 807 exerts a force to push bullet 806 back into contact with contact plate 801.

In some aspects, contact plate 801 includes features that extend around the edge of bullet 806 to maintain contact over a range of positions for bullet 806. These features may include one or surfaces that extend perpendicularly from contact plate 801, replacing contact plate 801 with a barrel similar to 405 of FIG. 4, additional conductive plates or rings connected to bypass wire 803, or other features. The purpose of these features may be to create an acceptable range of motion for bullet 806. For example, to accommodate flexing of a boot or similar footwear article when being tried on by a customer.

Figure 9:
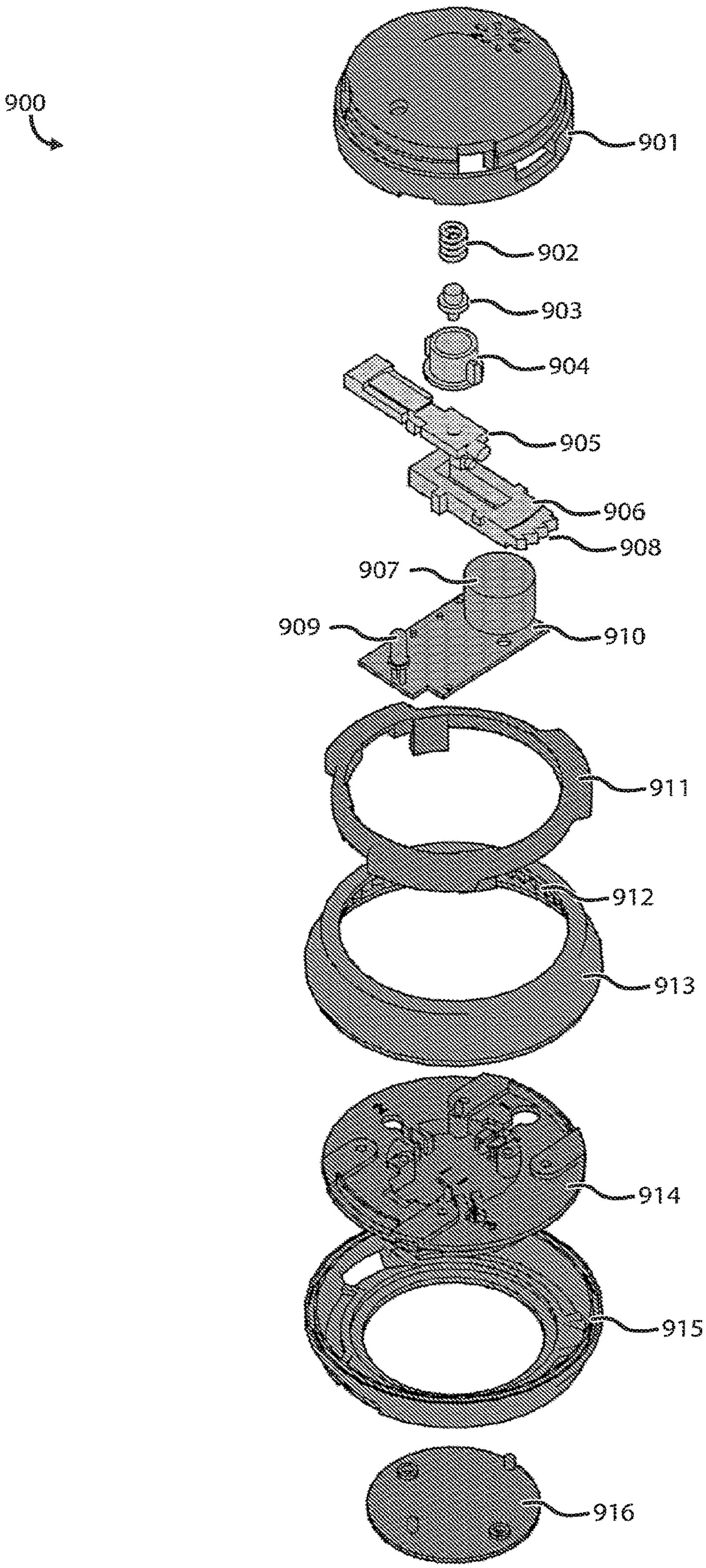
FIG. 9 is a perspective drawing of the exploded components of a tag, according to some aspects.

Turning now to FIG. 9, a perspective drawing of the exploded components in a tag, such as tag 201 of FIG. 2, is shown, according to some aspects. Tag 900 comprises upper housing 901, spring 902, securing pin 903, securing pin support 904, locking latch 905, ratcheting arm 906, circuit board 910, grip wheel 911, ratcheting case 913, mounting platform 914, lower enclosure 915, and battery cover 916.

Circuit board 910 further comprises LED 909 and alarm speaker 907. If tag 900 enters an alarm state, then alarm speaker 907 emits a high decibel alarm and LED 909 flashes rapidly. Tag 900 may enter an alarm state if a connecting wire is cut, if a tension on a connecting wire activates a tension switch, if tag 900 detects that it is being removed from a store, or for other reasons. LED 909 may also communicate other information through combinations of flashes, such as regular, infrequent flashes to indicate normal operation and/or a higher frequency of flashes to indicate a low battery.

In some aspects, there is a delay between the detection of a broken circuit and tag 900 entering an alarm state. For example, a two second delay may be used, such that if a monitored circuit is reinstated within two seconds, then no alarm is emitted. This accommodates brief increases in tension on connecting wires, such as may occur in momentary flexing of a boot when being tried on, which may trigger tension switches to momentarily create a break in the circuit.

In some aspects, tag 900 incorporates a mechanism to wind-in excess lengths of wire. Having slack in the connecting wires of a boot wire tag, such as wires 105, 109, and 114 of FIG. 1, enables a person to more easily position a boot wire tag on a boot or similar footwear article. The wind-in mechanism in tag 900 can then be used to remove the slack in the connecting wires and secure the boot wire tag in place. The components of FIG. 9 are for use in a system whereby a portion of tag 900 is rotated, which in turn draws the excess wire into the housing, where they are stored in spirals of wire.

In some aspects, grip wheel 911 is securely coupled to mounting platform 914, and a force can be applied to cause the coupled pair to freely rotate relative to housing components 913 and 915. Spring 902, securing pin 903, securing pin support 904, locking latch 905, ratcheting arm 906, and circuit board 910 may rotate along with grip wheel 911. When locking latch 905 is slid into a locked position, securing pin 903 descends under the effect of spring 902, and locking latch 905 is secured in place. When locking latch is in the locked position, and grip wheel 911 is rotated, saw tooth features 908 on ratcheting arm 906 engage with saw tooth features 912 located around the inner circumference of ratcheting case 913. Ratcheting arm 906 may be forced into engagement under the effect of a spring (not shown). The engagement of saw tooth features 908 and 912 enables grip wheel 911 to be rotated in one direction, but prevents rotation in the reverse direction. Through this method, connecting wires can be tightened but not loosened.

Connecting wires of a boot wire tag, such as wires 105, 109, and 114, may enter tag 900 through openings in lower enclosure 915, pass through openings in mounting platform 914, and be securely coupled to circuit board 910. Rotation of mounting platform 914 relative to lower enclosure 915 may draw the connecting wires into the body of tag 900, creating spirals of wire within the cavity between mounting platform 914 and lower enclosure 915.

In some aspects, battery cover 916 is welded or glued in place during assembly of tag 900. In some aspects, battery cover 916 is removable by unscrewing retaining screws, applying magnets to release magnetic latches, or some other method. Removal of battery cover 916 may facilitate replacing the battery. When tag 900 is in place on an article of footwear, battery cover 916 faces the article of footwear, and so is difficult to access and/or tamper with. In some aspects, tag 900 comprises an induction charging loop, charging port, or other method of charging an internal rechargeable battery.

Figure 10A:
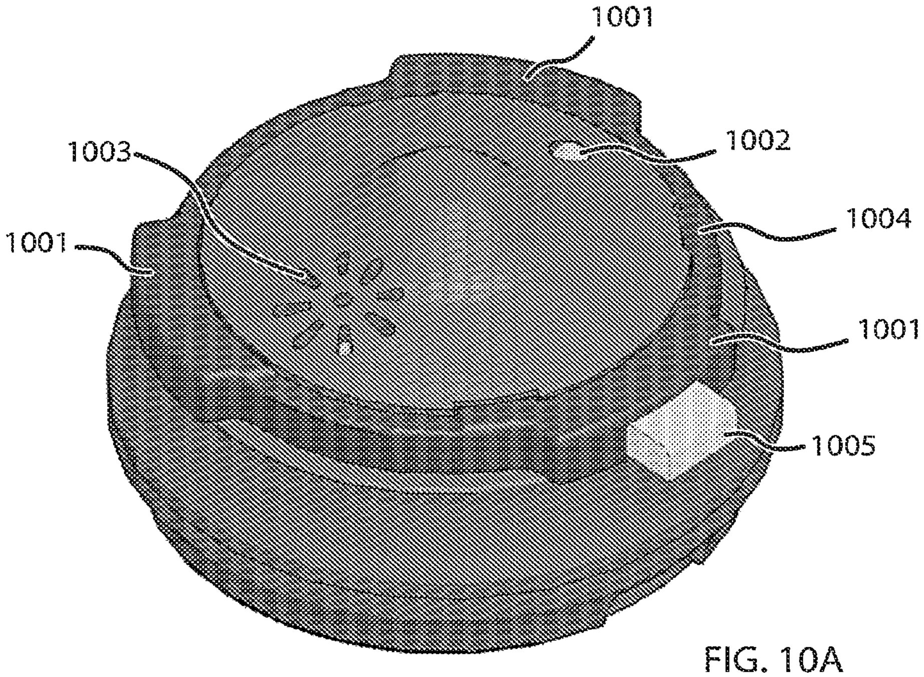
FIG. 10A is a perspective drawing of a tag with locking latch in an unlocked position, according to some aspects.

Turning now to FIG. 10A, a perspective drawing of a tag with locking latch in an unlocked position is shown, according to some aspects. Note that the components in FIG. 10A are shown rotated 180 degrees to those shown in FIG. 9. Grip wheel 1004 comprises a plurality of radial protrusions 1001, which a person can use to securely grasp grip wheel 1004. In an unlocked position, locking latch 1005 protrudes from the edge of grip wheel 1004. To transfer to a locked position, locking latch 1005 is pushed into the housing.

Figure 10B:
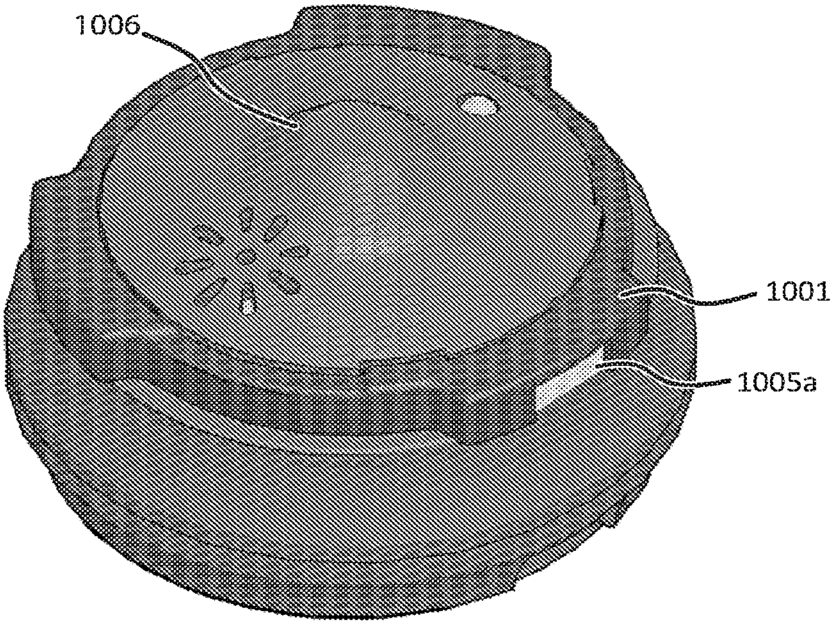
FIG. 10B is a perspective drawing of a tag with locking latch in a locked position, according to some aspects.

Turning now to FIG. 10B, a perspective drawing of a tag with locking latch in a locked position is shown, according to some aspects. In a locked position 1005*a*, locking latch 1005 no longer protrudes from grip wheel 1004. Locking latch 1005 may be held in a locked position by a securing pin, such as securing pin 903 of FIG. 9. The securing pin may be made from a ferromagnetic material. In which case, to release the securing pin, and in doing so release locking latch 1005, a magnet may be placed in close proximity to protrusion 1006. The securing pin is drawn towards the magnet, and locking latch 1005 is released. Locking latch 1005 may be pushed into the unlocked position under the influence of a spring. With locking latch 1005 released, grip wheel 1004 can rotate freely, and in doing so can release any wires that were wound into the alarming tag.

In some aspects, delaying insertion of locking latch 1005 facilitates adjusting a boot wire tag to the correct tension. A person can place the boot wire tag in the appropriate arrangement on an article of footwear, and then begin rotating grip wheel 1004 to reduce the length of the connecting wires. With locking latch 1005 in the unlocked position, grip wheel 1004 may be rotated in both directions—both tightening and loosening the connecting wires. A person may continue to tighten the connecting wires until the tag indicates that it has entered an alarm state. This may indicate that tension switches have been activated. A person could then reverse the rotation of grip wheel 1004 a required distance to loosen the connecting wires, and then set locking latch 1005 to the locked position 1005*a*. In some aspects, the initial period after entering an alarm state uses an intermittent or lower decibel warning alarm, indicates the alarm state though use of only the LED, or uses some other method to facilitate correctly tensioning a boot wire tag without activating the full alarm.

In some aspects, two ratcheting mechanisms are used. For example, both tag 107 and tag 108 of FIG. 1 may comprise ratcheting mechanisms. The simultaneous or alternate use of both ratcheting mechanisms enables slack in wires to be taken in at both ends. If one or more wires feature inline tension switches located at the midpoint of the wire, then the use of both ratcheting mechanisms enables symmetrical shortening of wires, which ensures that an inline tension switch remains located halfway along the exposed length of wire.

Figure 11:
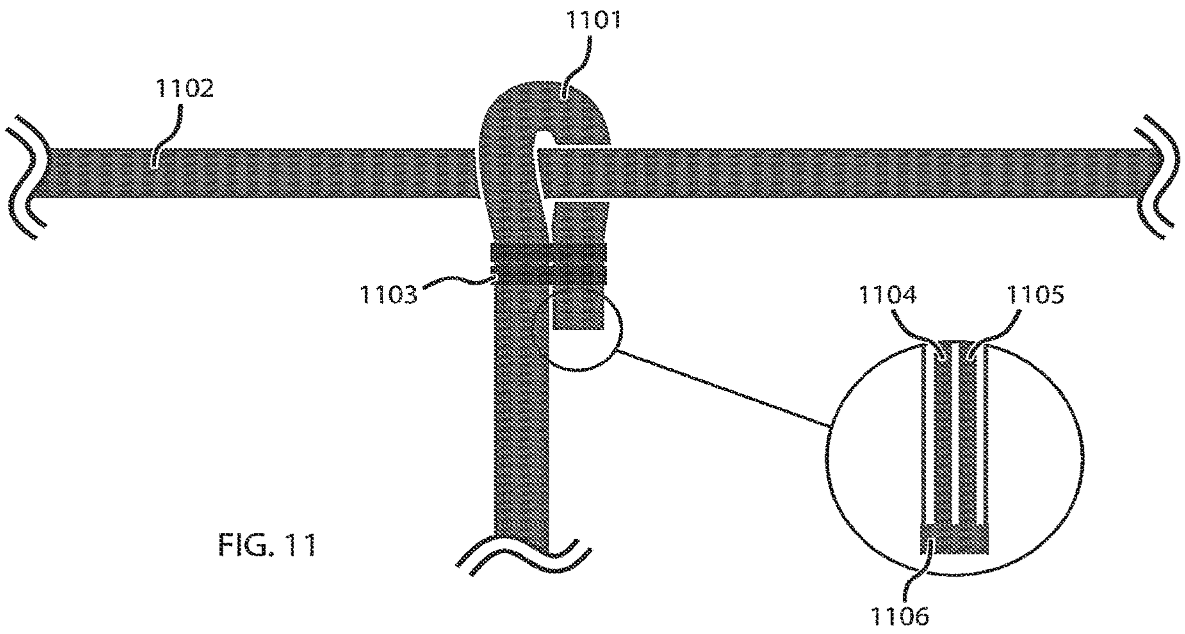
FIG. 11 is a drawing of a method of securing a first wire to a second wire, according to some aspects.

Turning now to FIG. 11, a drawing of a method of securing a first wire to second wire is shown, according to some aspects. A tag, such as tag 211 of FIG. 2, may be replaced with a looped wire connection. Wire 1102 is equivalent to wire 208 of FIG. 2, and wire 1101 is equivalent to wire 207 of FIG. 2. In some aspects, wire 1101 may be looped around wire 1102, and then secured with retaining fastening 1103. The loop formed in wire 1101 may be free to move along the length of wire 1102 in the same manner as a tag 211 of FIG. 2. If wire 1101 comprises two conductors 1104 and 1105, for example for the purpose of detecting if the wire is cut, then conductive end cap 1106 may be used to complete the circuit.

Figure 12:
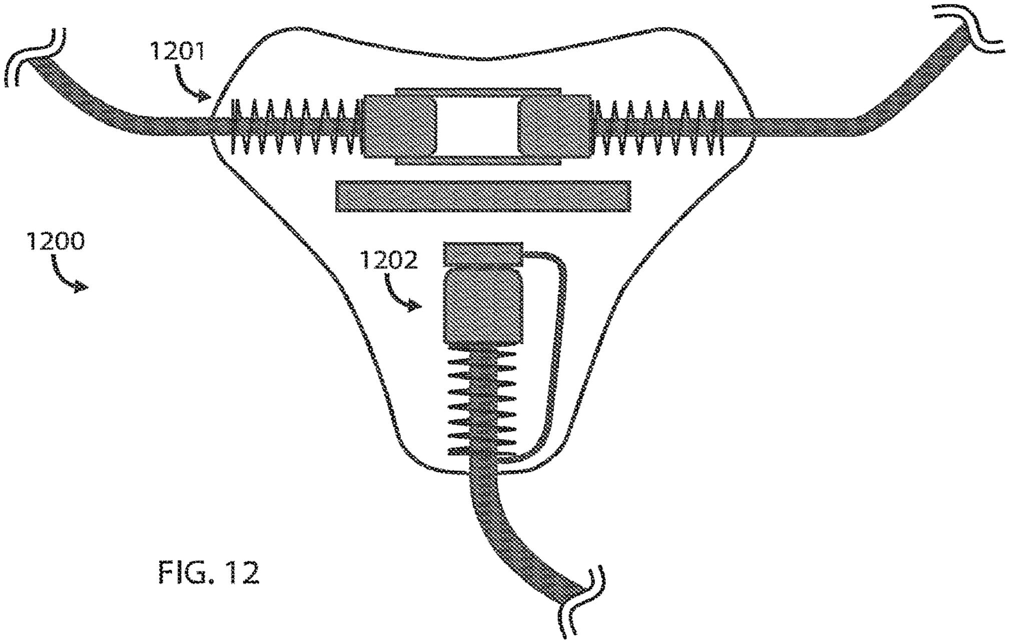
FIG. 12 is a cross-sectional drawing of a tag that includes both inline and terminating tension switches, according to some aspects.

Turning now to FIG. 12, a cross-sectional drawing of a tag that includes both inline and terminating tension switches is shown, according to some aspects. Tag 1200 may comprise of both inline tension switch 1201 and terminating tension switch 1202. This may remove the need for inline tension switches at other points along the length of the wires.

Figure 13:
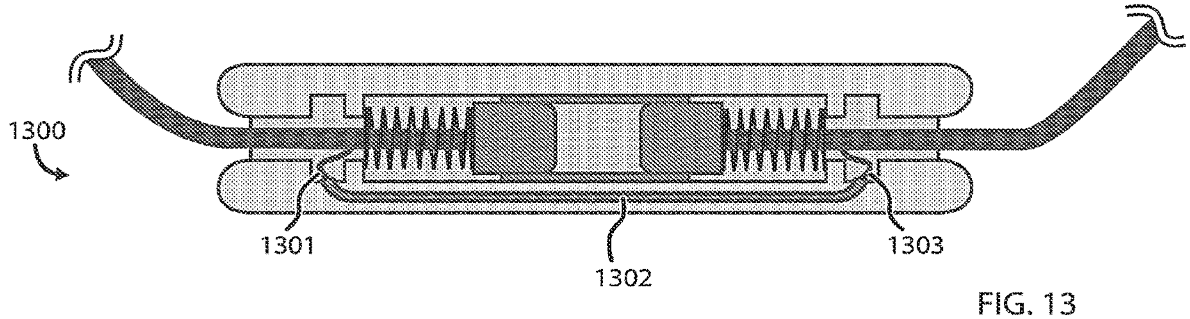
FIG. 13 is a cross-sectional drawing of an inline tension switch for a wire comprising two conductors, according to some aspects.

Turning now to FIG. 13, a cross-sectional drawing of an inline tension switch for a wire comprising two conductors is shown, according to some aspects. Dual conductor inline tension switch 1300 comprises the same components as described in relation to FIG. 4A, but accommodates wires with two conductors, as described in relation to FIG. 7. Dual conductor inline tension switch 1300 comprises bypass conductor 1302, to which outer conductors 1301 and 1303 are attached. The path of the inner conductors can be broken under tension, as described in relation to FIG. 4B. However, the path of the outer conductor remains intact. In some aspects, the components are arranged such that tension on a wire breaks an electrical path for both an inner conductor and an outer conductor. For example, by dividing a conductive bullet, such as bullets 404 and 406 of FIG. 4A, into two separate portions that are insulated from each other and using a similarly portioned and insulated barrel.

Figure 14A:
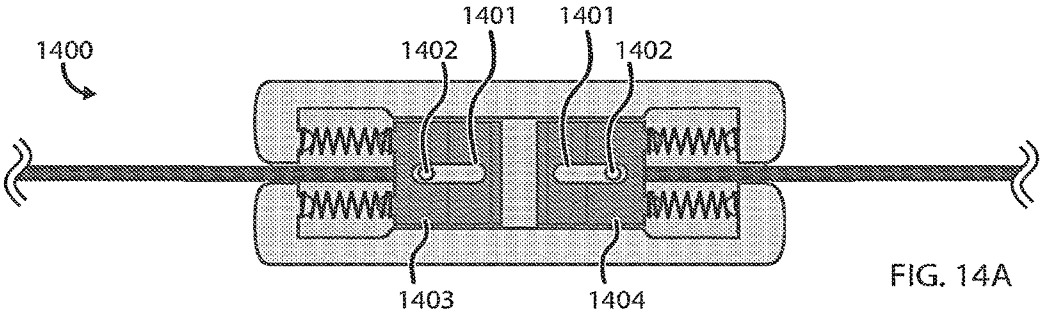
FIG. 14A is a cross-sectional drawing of a flat inline tension switch, according to some aspects.

Turning now to FIG. 14A, a cross-sectional drawing of a flat inline tension switch is shown, according to some aspects. Flat inline tension switch 1400 functions using the same principles as described in relation to FIG. 4A and FIG. 4B. However, bullets, such as bullets 404 and 406, are replaced with conductive blades 1403 and 1404. Conductive blades 1403 and 1404 may feature slots 1401 that receive protrusions 1402 to guide their motion.

Figure 14B:
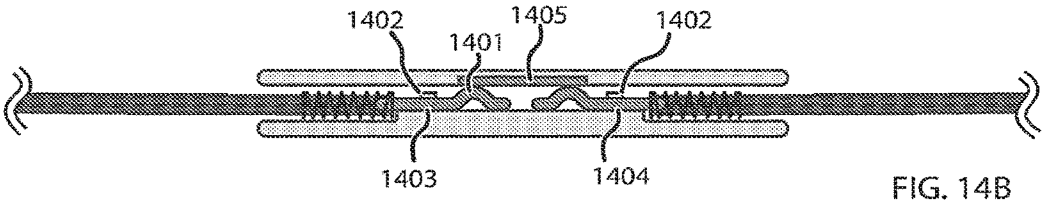
FIG. 14B is a cross-sectional drawing of a flat inline tension switch from an alternative perspective, according to some aspects.

FIG. 14B shows the flat inline tension switch of FIG. 14A from an alternative perspective. Conductive blades 1403 and 1404 feature raised portions, such as raised portion 1401. In a closed position, the raised portions of the blades are in contact with conductive bridge 1405, which enables a current to flow between blades 1403 and 1404. When one or more of the wires is under tension, the blades move laterally. Under sufficient tension, a blade may move to a position where its raised portion is no longer be in contact with conductive bridge 1405, which breaks the flow of electricity.

Figure 14C:
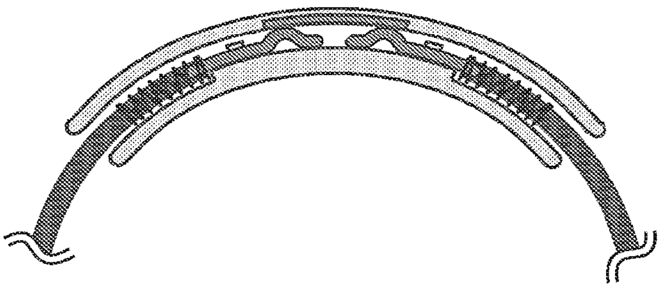
FIG. 14C a cross-sectional view of a curved flat inline tension switch, according to some aspects.

Turning now to FIG. 14C, a cross-sectional view of a curved flat inline tension switch is shown, according to some aspects. In some aspects, the inline tension switch may be curved, or otherwise shaped, to fit the location in which it will be placed. For example, it may be curved to match the curve of a heel counter.

Figure 15A:
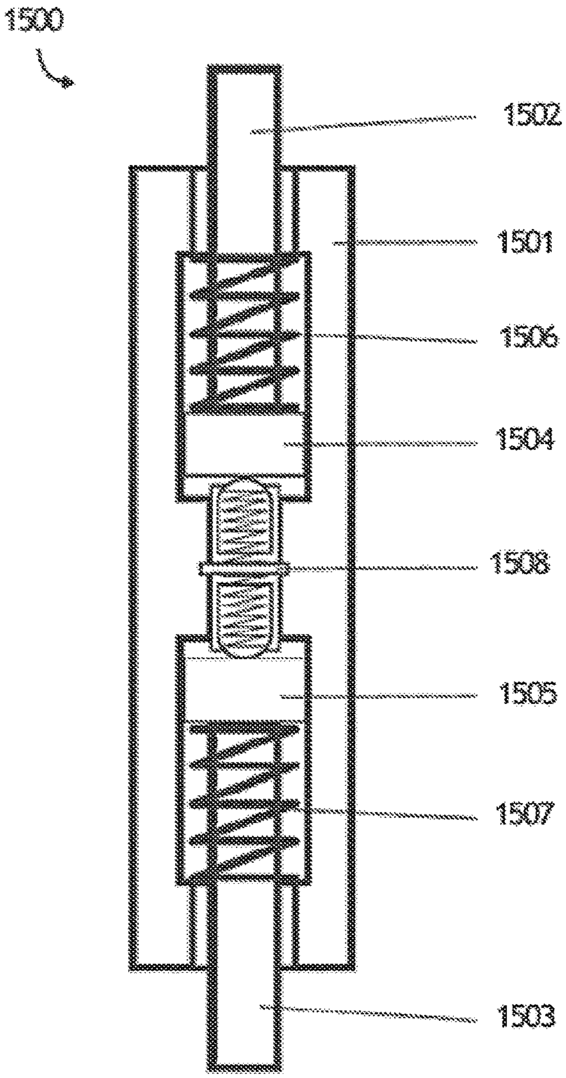
FIG. 15A is a cross-sectional view of an example of an inline tension switch, including a back-to-back pogo pin assembly, in a closed or connected state or position.
Figure 15B:
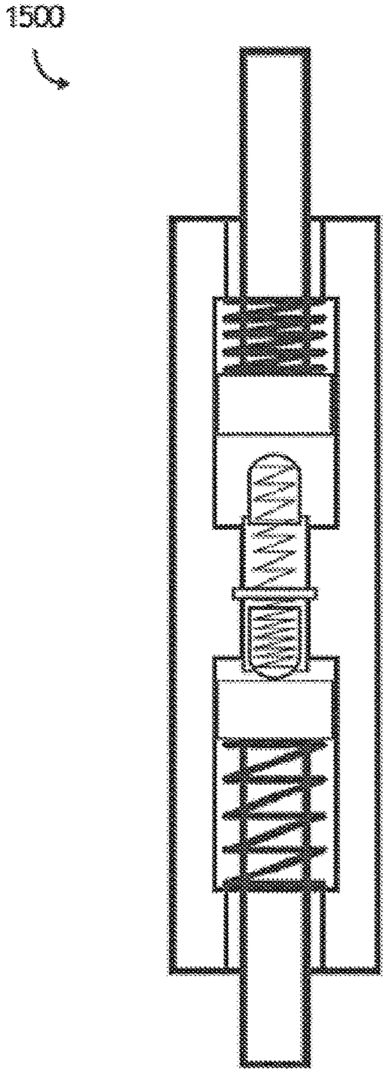
FIG. 15B is a cross-sectional view of the inline tension switch of FIG. 15A in an open or disconnected state or position.

Turning now to FIGS. 15A and 15B, a cross-sectional view of another example of an inline tension switch 1500 includes a back-to-back pogo pin assembly 1508 in a closed or connected state or position (FIG. 15A) and in one example of an open or disconnected state or position (FIG. 15B). Inline tension switch 1500 functions using a back-to-back pogo pin assembly 1508 that includes movable, spring loaded pins that electrically connect the circuit used to trigger the alarm. The inline tension switch 1500 includes a tension switch housing 1501 having a first chamber that houses a movable first contact plate 1504 fixedly mounted to wire 1502 and a second chamber that houses a movable second contact plate 1505 fixedly mounted wire 1503. The inline tension switch 1500 further includes, within the first chamber, a first spring member 1506, connected at a first end to the first contact plate 1504 and connected at a second end at a first open end of the switch housing 1501. The inline tension switch 1500 further includes, within the second chamber, a second spring member 1507, connected at a first end to the second contact plate 1505 and connected at a second end at a second open end of the switch housing 1501. The back-to-back pogo pin assembly 1508 is located between the first contact plate 1504 and the second contact plate 1505, such as but not limited to at a center of the tension switch housing 1501.

The pogo pin assembly 1508 includes a first bullet member and a second bullet member, which are movable relative to one another within a bullet housing. Further, the first bullet member and second bullet member are biased away from one another, and toward the respective adjacent first contact plate 1504 and second contact plate 1505, by respective first and second inner spring members that are positioned between a wall and a respective one of the first and second bullet members. Each of the first and second inner spring member exerts a force which pushes the corresponding first bullet member and the second bullet member in opposing directions toward the first and second contact plates 1504, 1505 respectively. The first and second inner spring member are configured with a sufficient spring force to oppose the spring force of the respective one of the first and second spring member 1506, 1507 such that each contact plate 1504, 1505 contacts the corresponding first or second bullet member of the pogo pin assembly 1508 when an amount of force on either or both wires 1502, 1503 is less than the threshold amount of tensile force configured to trigger the alarm.

Accordingly, as illustrated in FIG. 15A, when a tensile force exerted on either conductive wire does not exceed a threshold amount, the first contact plate 1504 makes an electrical connection with the first bullet member and the second contact plate 1505 make an electrical connection with the second bullet member, thereby defining a closed or connected position or state. Alternatively, as illustrated in the open or disconnected state of FIG. 15B, when one or more of the wires 1502, 1503 is under tension that reaches or exceeds the threshold amount of tensile force, one or both of the respective contact plate 1504, 1505 is configured move within the respective first or second chamber to a position where it is no longer in contact with the pogo pin assembly 1508, which in turn breaks the flow of electricity.

EXAMPLE IMPLEMENTATIONS

The following paragraphs include example implementations of the aspects described herein.

Aspect 1. A security tag assembly for placing around a boot, comprising:

a circuit board including a processor;

one or more wires electrically connected to the circuit board, wherein the one or more wires form a first opening and a second opening, wherein the first opening is configured to receive a first component of the boot and the second opening is configured to receive a second component of the boot;

a tension switch connected to the one or more wires and having a closed position corresponding to a first tension level on the one or more wires and an open position corresponding to a second tension level on the one or more wires, wherein the second tension level is greater than the first tension level; and wherein the processor is configured to monitor whether the tension switch is in at least the open position, wherein the processor is configured to trigger an alarm in response to the switch being in the open position.

Aspect 2. The security tag assembly of aspect 1, wherein at least one length of wire of the one or more wires is configured to prevent the security tag assembly from being removed from the boot.

Aspect 3. The security tag assembly of any of the above aspects, wherein the first component of the boot is a boot shaft, and the second component of the boot is a boot bridge.

Aspect 4. The security tag assembly of any of the above aspects, wherein the one or more wires are only a single wire used to create both the first opening and the second opening and in turn configured to receive both the first component of the boot and the second component of the boot.

Aspect 5. The security tag assembly of any of the above aspects, wherein the tension switch further comprises:

a switch housing having an internal wall defining a chamber having an open end, wherein the chamber extends into the switch housing;

a contact member mounted within the chamber;

a bullet mounted within the chamber and electrically connected to the one or more wires;

wherein at least one of the bullet or the contact plate is movable within the chamber between a first position that makes an electrically conductive connection between the bullet and the contact member and a second position that creates a spacing between the bullet and the contact member; and a spring member mounted within the chamber and in contact with the at least one of the bullet or the contact member, wherein the spring member has a spring force configured to bias the bullet into contact with the contact member.

Aspect 6. The security tag of any of the above aspects, wherein:

the chamber includes another open end to define an opening through the switch housing;

the contact member includes a barrel member having at least one wall defining a first contact surface and a second contact surface;

the bullet includes a first bullet member and a second bullet member, wherein the first bullet member is connected to a first end of the one or more wires and the second bullet member is connected to a second end of the one or more wires, wherein the first bullet member is movable within the chamber between a first closed position that makes electrical contact with a first end of the barrel member and a first open position spaced apart from the first end of the barrel member, and wherein the second bullet member is movable within the chamber between a second closed position that makes electrical contact with a second end of the barrel member and a second open position spaced apart from the second end of the barrel member; and the spring member includes a first spring member and a second spring member, wherein the first spring member biases the first bullet member toward the first closed position and the second spring member biases the second bullet member toward the second closed position.

Aspect 7. The security tag of any of the above aspects, wherein the contact member comprises a contact plate fixedly mounted at an end of the chamber opposite the open end; and the spring member is mounted between the open end of the chamber and the bullet, and in contact with the bullet.

Aspect 8. The security tag of any of the above aspects, further comprising:

wherein the bullet comprises a movable first contact plate and a movable second contact plate respectively fixedly mounted to a free end of each of the one or more wires;

wherein the spring member includes a first outer spring member and a second outer spring member, each connected at a first end to a respective contact plate and connected at a second end to a respective open end of the switch housing;

wherein the contact member includes a first bullet member and a second bullet member, wherein the first bullet member and the second bullet member are configured to be movable relative to one another;

a first inner spring member and a second inner spring member, wherein the first inner spring member exerts a first force and the second inner spring member exerts a second force which respectively biases the first bullet member and the second bullet member in opposing directions toward the first and second contact plates respectively; and wherein the first contact plate makes an electrical connection with the first bullet member and the second contact plate make an electrical connection with the second bullet member in the closed position.

Aspect 9. The security tag of any of the above aspects, wherein:

the contact member includes a bridge member having at least one wall defining a first contact surface and a second contact surface; and the bullet includes a first blade member connected at a first end to the one or more wires and a second blade member connected at a second end to the one or more wires, wherein each of the first blade member and the second blade member are configured to move within the chamber to make an electrical connection with the bridge member.

Aspect 10. The security tag of any of the above aspects, wherein the tension switch further comprises:

a switch housing having an internal wall defining an opening through the switch housing;

a barrel connected to the switch housing inside the opening, wherein the barrel includes a wall defining a barrel opening having a first opening end and a second opening end;

a first bullet connected to the one or more wires, wherein the first bullet is movable within the opening between a first position that makes a first electrically conductive connection with the first opening end of the barrel and a second position that is spaced apart from the first opening end of the barrel;

a second bullet connected to the one or more wires, wherein the second bullet is movable within the opening between a third position that makes a second electrically conductive connection with the second opening end of the barrel and a fourth position that is spaced apart from the second opening end of the barrel;

a first spring member mounted within the opening in the switch housing and configured to contact a first end of the opening and the first bullet; and a second spring member mounted within the opening in the switch housing and configured to contact a second end of the opening and the second bullet.

Aspect 11. The security tag assembly of any of the above aspects, wherein in the open position there is tension in the one or more wires and wherein at least one of the first spring member or the second spring member is compressed such that the electrical connection between at least one of the first bullet and the second bullet and the barrel is broken.

Aspect 12. The security tag assembly of any of the above aspects, wherein an amount of the compression corresponds to the second tension level in the one or more wires.

Aspect 13. The security tag assembly of any of the above aspects, wherein at least one of the one or more wires further includes a block, wherein the block is configured to prevent movement of the one or more wires on an outside surface of the boot and prevent the one or more wires from damaging the boot, and wherein the block is shaped to match the shape of the boot where the block is located.

Aspect 14. The block of any of the above aspects, wherein the block may further comprise an additional switch.

Aspect 15. The security tag assembly of any of the above aspects, wherein the one or more wires are arranged to form:

a circular loop; and a semicircular loop that is angled at least 70 degrees from the circular loop.

Aspect 16. The security tag assembly of any of the above aspects, further comprising the alarm electrically connected to the circuit board and in electrical communication with the processor.

Aspect 17. The security tag assembly of any of the above aspects, wherein the alarm comprises at least one of an audio speaker generating an audible sound or a lighting device generating a visible light.

Aspect 18. The security tag assembly of any of the above aspects, further comprising a security tag member.

Aspect 19. The security tag assembly of any of the above aspects, wherein the security tag member includes at least one of an acousto-magnetic tag or a radio frequency tag.

Aspect 20. A security tag assembly for placing around a boot, comprising: a security tag housing, at least a first wire, a second wire and a third wire, and a first tension switch and a second tension switch; wherein the security tag housing is configured to hold a circuit board including a processor, a security tag member, which includes at least one of an acousto-magnetic tag or a radio frequency tag, and an alarm electrically connected to the circuit board and in electrical communication with the processor; wherein the first tension switch further comprises: a first switch housing having an internal wall defining an opening through the switch housing; a barrel connected to the switch housing inside the opening, wherein the barrel includes a wall defining a barrel opening having a first opening end and a second opening end; a first bullet connected to the one or more wires, wherein the first bullet is movable within the opening between a first position that makes a first electrically conductive connection with the first opening end of the barrel and a second position that is spaced apart from the first opening end of the barrel; a second bullet connected to the one or more wires, wherein the second bullet is movable within the opening between a third position that makes a second electrically conductive connection with the second opening end of the barrel and a fourth position that is spaced apart from the second opening end of the barrel; a first spring member mounted within the opening in the switch housing and configured to contact a first end of the first switch housing and the first bullet; and a second spring member mounted within the opening in the switch housing and configured to contact a second end of the first switch housing and the second bullet; and wherein the second tension switch comprises: a second switch housing having an internal wall defining a chamber configured to extend partially through the switch housing; a contact plate mounted within the chamber; a third bullet mounted within the chamber and electrically connected to the third wire; wherein the third bullet is movable within the chamber between a first position that makes an electrically conductive connection between the third bullet and the contact plate and a second position that creates a spacing between the bullet and the contact member; and a third spring member mounted within the chamber and in contact with the third bullet, wherein the third spring member has a spring force configured to bias the third bullet into contact with the contact plate.

Aspect 21. An electrical switch that opens under tension, comprising: a conductive bridge; a first conductive wire and a second conductive wire in contact with the conductive bridge; a spring in contact with each conductive wire that exerts a force to maintain that wire's contact with the conductive bridge; and a housing that directs tensile forces acting upon each wire to act in opposition to each wire's spring; wherein a tensile force exerted on either conductive wire that exceeds a threshold amount breaks the contact between that wire and the conductive bridge.

Aspect 22. An electrical switch that opens under tension, comprising: a conductive bridge a first wire and a second wire in continuity with the conductive bridge; a first biasing member configured to apply a reaction force to the first wire; a second biasing member configured to apply a reaction force to the second wire, wherein the first biasing member and second biasing member maintain continuity between the first wire and the conductive bridge and the second wire and the conductive bridge; and a housing that directs tensile forces acting upon the first wire or the second wire to act in opposition to at least one of the first biasing member and the second biasing member; wherein a tensile force exerted on either one of the first wire or the second wire that exceeds a threshold amount breaks the continuity between the respective one of the first wire or the second wire and the conductive bridge.

Aspect 23. The electrical switch of any of the above aspects, wherein the first biasing member is a first spring and the second biasing member is a second spring.

Aspect 24. The electrical switch of any of the above aspects, wherein the first wire is coupled with and in continuity with a first bullet, wherein the first bullet is configured to slidably fit-within the conductive bridge to create a conductive path therebetween.

Aspect 25. The electrical switch of any of the above aspects, wherein the second wire is coupled with and in continuity with a second bullet, wherein the second bullet is configured to slidably fit-with the conductive bridge to create a conductive path therebetween.

Aspect 26. The electrical switch of any of the above aspects, wherein the first bullet is configured to be in contact with a first side of the conductive bridge until a tensile force that exceeds the threshold amount separates the first bullet from the first side of the conductive bridge; and wherein the second bullet is configured to be in contact with a second side of the conductive bridge until a tensile force that exceeds the threshold amount separates the second bullet from the second side of the conductive bridge.

Aspect 27. The electrical switch of any of the above aspects, wherein the conductive bridge comprises a pogo-pin assembly configured to be in continuity with the first wire until the tensile force exerted on the first wire exceeds the threshold amount.

Aspect 28. The electrical switch of any of the above aspects, wherein the pogo-pin assembly comprises a pogo pin biasing member.

Aspect 29. The electrical switch of any of the above aspects, wherein the pogo pin biasing member is a spring.

Aspect 30. The electrical switch of any of the above aspects, wherein the conductive bridge is a contact plate, and wherein the first wire is coupled with and in continuity with a first conductive blade and the second wire is coupled with and in continuity with a second conductive blade.

Aspect 31. An electrical switch comprising: a conductive bridge; a first wire configured to provide continuity with the conductive bridge; a biasing member connected to the first wire, wherein the biasing member provides a threshold reaction force to maintain continuity between the first wire and the conductive bridge; and a housing that directs tensile forces acting upon the first wire to oppose a reaction force of the biasing member; wherein a tensile force acting on the first wire that exceeds a threshold reaction force of the biasing member breaks the continuity between the first wire and the conductive bridge.

Aspect 32. The electrical switch of any of the above aspects, wherein the biasing member is a spring.

Aspect 33. The electrical switch of any of the above aspects, wherein the first wire is coupled with and in continuity with a bullet, wherein the bullet is configured to slidably fit-within the conductive bridge to create a conductive path therebetween.

Aspect 34. The electrical switch of any of the above aspects, wherein the first wire is coupled with and in continuity with a bullet, wherein the bullet is configured to slidably fit-within the conductive bridge to create a conductive path therebetween.

Aspect 35. The electrical switch of any of the above aspects, wherein the conductive bridge comprises a pogo-pin assembly configured to be in continuity with the first wire until the tensile force exerted on the first wire exceeds the threshold reaction force of the biasing member.

Aspect 36. The electrical switch of any of the above aspects, wherein the pogo-pin assembly comprises a pogo pin biasing member.

Aspect 37. The electrical switch of any of the above aspects, wherein the pogo pin biasing member is a spring.

Aspect 38. The electrical switch of any of the above aspects, wherein the conductive bridge is a contact plate, and wherein the first wire is coupled with and in continuity with a bullet, wherein the bullet is configured to contact the contact plate until a tensile force that exceeds the threshold reaction force acts on the first wire.

Aspect 39. The electrical switch of any of the above aspects, wherein the first wire comprises a first conductive pathway, a second conductive pathway, and a dielectric or insulator between the first conductive pathway and the second conductive pathway, wherein the first conductive pathway is coupled with and in continuity with the bullet and wherein the second conductive pathway is coupled with and in continuity with the contact plate, wherein when the contact plate and the bullet are in physical contact, an electrical current can flow from the first conductive pathway to the second conductive pathway and wherein when the contact plate and the bullet are separated due to the tensile force being applied to the first wire, electrical current cannot flow from the first conductive pathway to the second conductive pathway.

Aspect 40. The electrical switch of any of the above aspects, wherein the conductive bridge is a contact plate, and wherein the first wire is coupled with and in continuity with a conductive blade.

Aspect 41, The electrical switch of any of the above aspects, further comprising a second wire configured to provide continuity with the conductive bridge and a second biasing member connected to the second wire, wherein the second biasing member provides a second reaction force to maintain continuity between the second wire and the conductive bridge, wherein a tensile force exerted on the second wire that exceeds a threshold reaction force of the second biasing member breaks the continuity between the second wire and the conductive bridge Aspect 42, The electrical switch of any of the above aspects, wherein the first wire comprises a first wire inner conductor and a first wire outer conductor and the second wire comprises a second wire inner conductor and a second wire outer conductor, wherein the electrical switch further comprises: a bypass conductor connecting the first wire outer conductor and the second wire outer conductor and wherein an electrical continuity of the first wire inner conductor or the second wire inner conductor can be broken by applying tension to a respective one of the first wire and the second wire while the electrical continuity of the first wire outer conductor and the second wire outer conductor remains unbroken.

A further aspect includes a method of attaching an EAS device, including any of the aspects described above, to a boot. The method includes securing both ends of a first length of wire to a device, looping the first length of wire around the shaft of the boot, securing a first end of a second length of wire to the device, looping the second length of wire under the arch of the boot, and securing the second end of the second length of wire to the first length of wire.

Configuration of Exemplary Aspects

The construction and arrangement of the systems and methods as shown in the various exemplary aspects are illustrative only. Although only a few aspects have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative aspects. Other substitutions, modifications, changes, and omissions can be made in the design, operating conditions and arrangement of the exemplary aspects without departing from the scope of the present disclosure.

Although the above description may include a specific order of method steps, the order of the steps may differ from what is described. Also two or more steps can be performed concurrently or with partial concurrence. All such variations are within the scope of the disclosure.

What is claimed is:

1. An electrical switch for securing an article that opens under tension, comprising:

a conductive bridge;

a first wire and a second wire configured to be in continuity with the conductive bridge;

a first biasing member configured to apply a reaction force to the first wire;

a second biasing member configured to apply a reaction force to the second wire, wherein the first biasing member and second biasing member maintain continuity between the first wire and the conductive bridge and the second wire and the conductive bridge; and a housing that directs tensile forces acting upon the first wire or the second wire to act in opposition to at least one of the first biasing member and the second biasing member; wherein a tensile force exerted on either one of the first wire or the second wire that exceeds a threshold amount causes movement of either one of the first wire or the second wire with respect to the conductive bridge that breaks the continuity between the respective one of the first wire or the second wire and the conductive bridge.

2. The electrical switch of claim 1, wherein the first biasing member is a first spring and the second biasing member is a second spring.

3. The electrical switch of claim 1, wherein the first wire is coupled with and in continuity with a first bullet, wherein the first bullet is configured to slideably fit-within the conductive bridge to create a conductive path therebetween.

4. The electrical switch of claim 3, wherein the second wire is coupled with and in continuity with a second bullet, wherein the second bullet is configured to slideably fit-with the conductive bridge to create a conductive path therebetween.

5. The electrical switch of claim 4, wherein the first bullet is configured to be in contact with a first side of the conductive bridge until a tensile force that exceeds the threshold amount separates the first bullet from the first side of the conductive bridge; and wherein the second bullet is configured to be in contact with a second side of the conductive bridge until a tensile force that exceeds the threshold amount separates the second bullet from the second side of the conductive bridge.

6. The electrical switch of claim 1, wherein the conductive bridge comprises a pogo-pin assembly configured to be in continuity with the first wire until the tensile force exerted on the first wire exceeds the threshold amount.

7. The electrical switch of claim 6, wherein the pogo-pin assembly comprises a pogo pin biasing member.

8. The electrical switch of claim 7, wherein the pogo pin biasing member is a spring.

9. The electrical switch of claim 1, wherein the conductive bridge is a contact plate, and wherein the first wire is coupled with and in continuity with a first conductive blade and the second wire is coupled with and in continuity with a second conductive blade.

10. An electrical switch for securing an article comprising:

a conductive bridge;

a first wire configured to provide continuity with the conductive bridge;

a biasing member connected to the first wire, wherein the biasing member provides a threshold reaction force to maintain continuity between the first wire and the conductive bridge; and a housing that directs tensile forces acting upon the first wire to oppose a reaction force of the biasing member;

wherein a tensile force acting on the first wire that exceeds a threshold reaction force of the biasing member causes movement of the first wire with respect to the conductive bridge that breaks the continuity between the first wire and the conductive bridge.

11. The electrical switch of claim 10, wherein the biasing member is a spring.

12. The electrical switch of claim 10, wherein the conductive bridge comprises a pogo-pin assembly configured to be in continuity with the first wire until the tensile force exerted on the first wire exceeds the threshold reaction force of the biasing member.

13. The electrical switch of claim 12, wherein the pogo-pin assembly comprises a pogo pin biasing member.

14. The electrical switch of claim 13, wherein the pogo pin biasing member is a spring.

15. The electrical switch of claim 10, wherein the conductive bridge is a contact plate, and wherein the first wire is coupled with and in continuity with a bullet, wherein the bullet is configured to contact the contact plate until a tensile force that exceeds the threshold reaction force acts on the first wire.

16. The electrical switch of claim 15, wherein the first wire comprises a first conductive pathway, a second conductive pathway, and a dielectric or insulator between the first conductive pathway and the second conductive pathway, wherein the first conductive pathway is coupled with and in continuity with the bullet and wherein the second conductive pathway is coupled with and in continuity with the contact plate, wherein when the contact plate and the bullet are in physical contact, an electrical current can flow from the first conductive pathway to the second conductive pathway and wherein when the contact plate and the bullet are separated due to the tensile force being applied to the first wire, electrical current cannot flow from the first conductive pathway to the second conductive pathway.

17. The electrical switch of claim 10, wherein the conductive bridge is a contact plate, and wherein the first wire is coupled with and in continuity with a conductive blade.

18. The electrical switch of claim 10, further comprising a second wire configured to provide continuity with the conductive bridge and a second biasing member connected to the second wire, wherein the second biasing member provides a second reaction force to maintain continuity between the second wire and the conductive bridge, wherein a tensile force exerted on the second wire that exceeds a threshold reaction force of the second biasing member breaks the continuity between the second wire and the conductive bridge.

19. The electrical switch of claim 18, wherein the first wire comprises a first wire inner conductor and a first wire outer conductor and the second wire comprises a second wire inner conductor and a second wire outer conductor, wherein the electrical switch further comprises:

a bypass conductor connecting the first wire outer conductor and the second wire outer conductor and wherein an electrical continuity of the first wire inner conductor or the second wire inner conductor can be broken by applying tension to a respective one of the first wire and the second wire while the electrical continuity of the first wire outer conductor and the second wire outer conductor remains unbroken.

20. An electrical switch comprising:

a conductive bridge;

a first wire, wherein the first wire is coupled with and in continuity with a bullet, wherein the bullet is configured to slideably fit-within the conductive bridge to create a conductive path therebetween;

a biasing member connected to the first wire, wherein the biasing member provides a threshold reaction force to maintain continuity between the first wire and the conductive bridge; and a housing that directs tensile forces acting upon the first wire to oppose a reaction force of the biasing member;

wherein a tensile force acting on the first wire that exceeds a threshold reaction force of the biasing member breaks the continuity between the first wire and the conductive bridge.

* * * * *